Patented Mar. 22, 1938

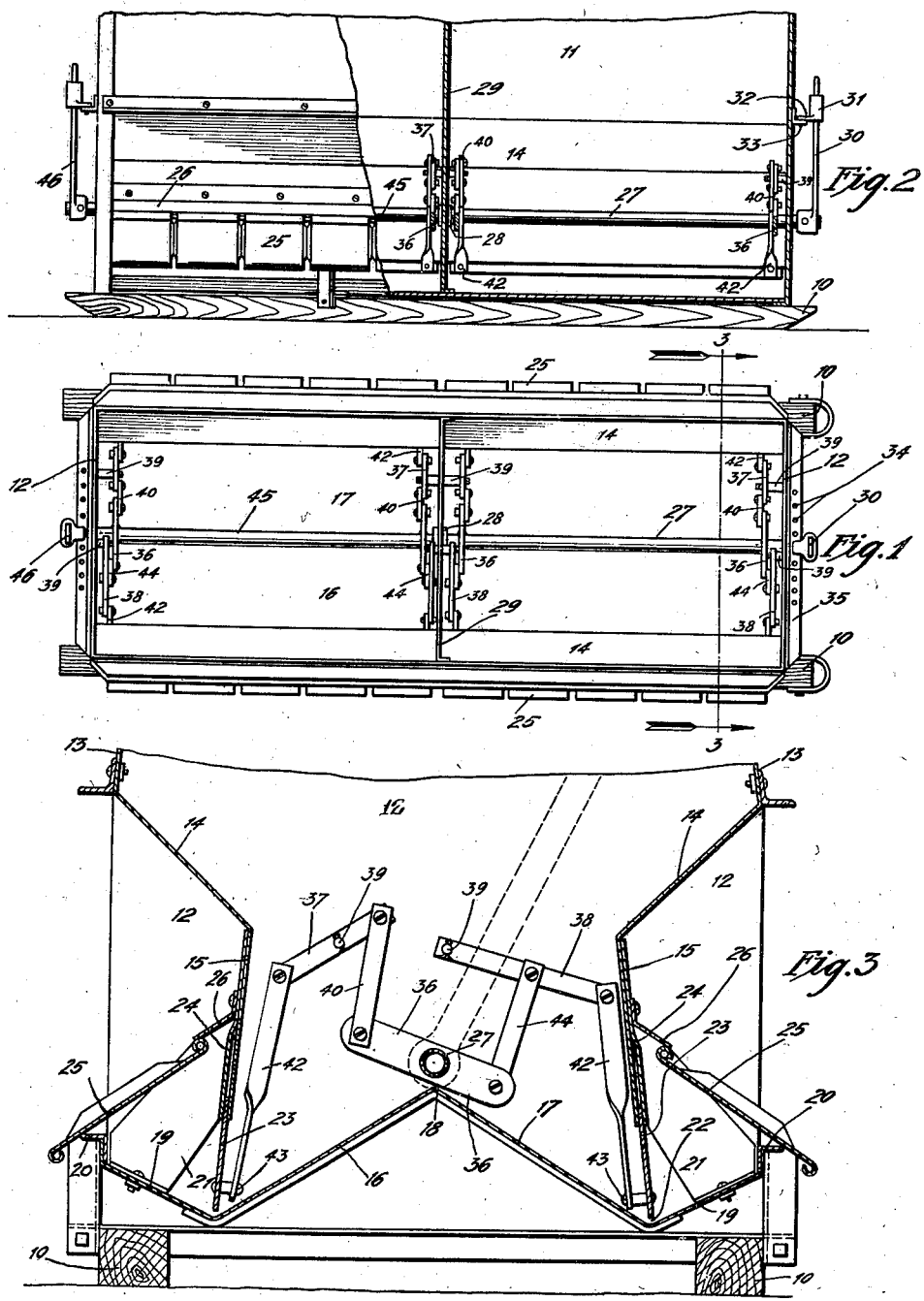

2,111,950

UNITED STATES PATENT OFFICE 2,111,950

STOCK FEEDER

William B. Thiemann, Albert City, Iowa

Application November 16, 1935, Serial No. 50,234

5 Claims. (Cl. 119—53)

This invention relates to improvements in stock feeders and particularly of that type having a hopper for automatically feeding grain or ground feed to suitable troughs at the bottom of the hopper. In this type of feeder the side members of the hopper usually terminate a slight distance above the central portion of the bottom of the trough, so that feed openings are provided through which the feed automatically is delivered to the trough by gravity. Usually gates are adjustably mounted to the lower edge of each of the side members for regulating the size of the feed openings. This adjusting means is in the form of set screws or bolts, which require considerable amount of time to accomplish the adjustment. The bolts also become rusty and sooner or later the gates become inoperative. Due to the fact that a considerable amount of time is necessary to accomplish the adjustment of the gates, the said gates are usually adjusted once and left in this position.

I have found in actual practice that if the gates are left in an open and operative position during the time the hopper is being filled with feed, shoveling the feed into the hopper will cause the troughs to become completely filled and sometimes run over. If the troughs are completely filled, the animals usually waste a considerable amount of the feed each time the hopper is filled and until the device is in normal working condition.

It is, therefore, the object of my invention to provide improved means for operating the gates closing the feed openings, whereby the gates may be easily and quickly moved to an open or closed position, and whereby the gates may be completely closed at the time the hopper is being filled, and then adjusted to the desired open position after the hopper is filled, permitting the grain to flow into the troughs in a natural manner.

More specifically it is the object of my invention to provide in a feeder, having a hopper and troughs at the lower end of the hopper with movable gates for closing said openings of the hopper, lever actuated means for simultaneously controling both gates of the hopper and for moving both ends of the gates simultaneously.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a plan view of my improved feeder.

Figure 2 is a side elevation of the lower end of the feeder, a portion of which is shown in section.

Figure 3 is an enlarged, detail, sectional view taken on the line 3—3 of Figure 1.

Referring to the accompanying drawing I have used the reference numeral 10 to indicate a pair of skids on which my improved feeder is mounted. The feeder comprises a hopper 11 having end members 12 and side members 13. The lower ends of the side members terminate in downwardly and inwardly inclined portions 14, which in turn terminate in downwardly and slightly outwardly inclined portions 15.

Supported between the end members 11 is a bottom 16 having inclined portions 17 extending downwardly and outwardly from its central portion 18. The lower ends of the portions 17 terminate in upwardly and outwardly inclined portions 19, each of which terminates in an upwardly extending portion 20 to form feed troughs 21. The lower edges of the members 15 terminate a slight distance above the bottom of the troughs to form feed openings 22.

Slidably mounted adjacent to the outer surface of the lower edge of each of the members 15 is a gate 23 for closing the opening 22. Supported adjacent to the outer surface of each of the gates 23 is a plate 24, the upper edge of which is secured to the outer surface of the upper end of the member 15. Said plate 24 provides a guide member for the gate 23.

Suitable covers 25 are also provided for the troughs 21. The upper edge of each cover is pivotally mounted to the lower edge of a corresponding plate 26, having its upper edge secured to the members 15 and 24.

Supported longitudinally above the portion 18 of the bottom member 16 I have mounted a tubular shaft 27, the inner end of which is rotatively mounted in a bearing 28 secured to the division plate 29, while the outer end of the shaft 27 extends through the end plate 12, and is provided with an upwardly extending lever 30. Said lever 30 has a sleeve 31 slidably mounted thereon. The lower end of the sleeve 31 has an inwardly projecting lug 32 provided with a downwardly extending pin 33 designed to enter any one of a series of openings 34 secured to an angle member 35 forming a part of the hopper frame. The member 31 and the pin 33 provide means whereby the lever 30 may be adjusted at various angular positions, the sleeve 31 being slidably mounted whereby the member 32 will follow the bar 35 as the lever 30 is adjusted to its various working positions.

Secured to each end of the shaft 27 is a rock arm 36 mounted within the hopper. Pivotally mounted to each side of the partition 29 and the inner faces of each of the end members 12 is a pair of levers 37 and 38, carried by pivot members 39 secured to the partition 29 and end members. The ends of each of the levers 36 are provided with links 40 and 44, the link 44 being pivotally connected to the corresponding lever 38 intermediate its ends, while the link 40 is connected to the inner end of the lever 37, as illustrated in Figure 3.

Pivotally connected to the outer end of each lever 37 is a link 42, the lower end of said link being pivotally connected to the lower edge of the adjacent gate 23 by means of pivot members 43. Thus it will be seen that if the shaft 27 is rocked by the lever 30, the arms 36 will also be rocked, causing the link 40 to be lowered and the link 44 to be elevated, or vice versa.

Thus means is provided whereby a rocking movement of the shaft 27 will cause the arms 36 to be elevated and lowered, and the inner ends of the arms 37 to be elevated and lowered, which in turn will cause the links 42 and the gates 23 connected thereto to be lowered and elevated. On account of the arms 36 being fixed to the shaft 27, both ends of the gates will be elevated and lowered simultaneously, in such a manner that the gates may be moved to a closed position when the hopper is being filled by simply manipulating the lever 30, and after the hopper has been filled, the said lever 30 may be operated in the opposite direction, causing the gates to be elevated any desired amount. In a like manner the gates of the opposite end of the hopper are operated by a similar shaft 45 and a lever 46.

Thus means is provided whereby the gates of one of the hopper compartments may be adjusted at different elevations from the gates of the other compartment, to meet the feeding conditions of various kinds of feed.

By this arrangement it will be seen that if a partition were supported between the ends of the hopper, then a set of gates and lever mechanism would be provided for each compartment, whereas if the hopper were provided with no central partition, then a single set of gates and a single gate operating mechanism would be provided.

Thus it will be seen that I have provided in an automatic feeder having feed openings and a gate for each of said openings improved means whereby the gates may be easily and quickly moved to either an open or closed position, and whereby the gates may be adjusted to various open positions to meet the feeding conditions of the material within the feeder.

By supporting the shaft 27 immediately above the portion 18 of the bottom, it will readily be seen that the shaft will not interfere with the movement of the feed to each of the feed troughs as the said shaft would simply serve as a dividing member for the two columns of feed.

I claim as my invention:

1. A stock feeder comprising in combination a hopper having end and side members, a bottom member having downwardly and outwardly inclined portions having their lower edges terminating in upwardly and outwardly inclined portions to form feed troughs, the lower edges of the side members terminating above the bottoms of said troughs to form feed openings, a gate slidably mounted adjacent to each side member and adapted to move into and out of the adjacent trough to close and open the adjacent feed opening, a shaft mounted above the central portion of said hopper, a rock arm on each end of said shaft and within said hopper, a pair of levers pivoted to each end of said hopper, a link connecting a corresponding lever with each end of said rock arm, a link pivotally connected to the outer end of each lever, the free end of each of the last said links being connected to an adjacent gate, and an operating lever mounted on the outer end of said shaft and outside of said hopper, whereby oscillation of said operating lever will cause said gates to be elevated or lowered.

2. A stock feeder comprising in combination a hopper having end and side members, a bottom member having downwardly and outwardly inclined portions having their lower edges terminating in upwardly and outwardly inclined portions to form feed troughs, the lower edges of the side members terminating above the bottoms of said troughs to form feed openings, a gate slidably mounted adjacent to each side member and adapted to move into and out of the adjacent troughs to close and open the adjacent feed opening, a shaft mounted above the central portion of said bottom, a rock arm on each end of said shaft and within said hopper, a pair of levers pivoted to each end of said hopper, a link connecting a corresponding lever with each end of said rock arm, a link pivotally connected to the outer end of each lever, the free end of each of the last said links being connected to an adjacent gate, an operating lever mounted on the outer end of said shaft and outside of said hopper, whereby oscillation of said operating lever will cause said gates to be elevated or lowered simultaneously, and means for locking said operating lever in various positions of its movement.

3. A stock feeder comprising in combination a hopper, a trough supported below the lower edge of each of the side members of said hopper, the lower edges of said side members being spaced above said troughs to form feed openings, a gate adjacent to each of the lower edges of said side members and mounted to slide upwardly and downwardly to open and close said openings, a shaft mounted through the central portion of said hopper, a rock arm on each end of said shaft and within said hopper, a pair of levers pivoted to each end of said hopper, a link pivoted to the outer end of each lever, means pivoting the free end of each link to an adjacent gate, a link having one end pivoted to one end of each rock arm, means pivotally connecting the free end of each of the last links with a corresponding lever at a point between its outer end and its pivot, a link having one end pivoted to the other end of each rock arm, and means pivotally connecting the inner ends of the other levers to the free ends of the last links, whereby rocking movement of said rock arms will cause both gates to be simultaneously opened or closed.

4. A stock feeder comprising in combination a hopper, a trough supported below the lower edge of each of the side members of said hopper, the lower edges of said side members being spaced above said troughs to form feed openings, a gate adjacent to each of the lower edges of said side members and mounted to slide upwardly and downwardly to open and close said feed openings, a shaft mounted through the central portion of said hopper, a rock arm on each end of said shaft and within said hopper, a pair of levers pivoted to each end of said hopper, a link connecting a corresponding lever with each end of said rock arm, a link pivotally connected to the outer end of each lever, the free end of each of the last said links being connected to an adjacent gate, an operating lever mounted on the outer end of said shaft and outside of said hopper, whereby oscillation of said operating lever will cause said gates to be elevated or lowered simultaneously, and means for locking said operating lever in various positions of its movement.

5. A stock feeder comprising in combination a hopper having a laterally extending frame member provided with a series of openings, troughs supported below the lower edges of each of the side members of said hopper, the lower edges of said side members being spaced above said troughs to form feed openings, a gate adjacent to each of the lower edges of said side members and mounted to slide upwardly and downwardly to open and close said feed openings, a lever mechanism within the hopper for elevating or lowering said gates simultaneously, said lever mechanism including a shaft having one end projecting outwardly from the hopper, a lever fixed to the outer end of said shaft and projecting upwardly and supported adjacent to one edge of said frame member, and a sleeve slidably mounted on said lever having a laterally projecting portion adapted to ride on the upper surface of said frame member and provided with a downwardly extending pin designed to enter the openings of said frame member whereby the lever may be locked in any of its adjusted positions of movement.

WILLIAM B. THIEMANN.